United States Patent [19]
Ward

[11] Patent Number: 5,520,804
[45] Date of Patent: May 28, 1996

[54] DEEP BED FILTRATION SYSTEM

[75] Inventor: Stephen D. Ward, Lewisburg, Pa.

[73] Assignee: Andritz Sprout-Bauer, Inc., Muncy, Pa.

[21] Appl. No.: 278,622

[22] Filed: Jul. 21, 1994

[51] Int. Cl.$^6$ ...................................................... B01D 24/46
[52] U.S. Cl. .......................... 210/189; 210/196; 210/268; 210/269; 210/274
[58] Field of Search ................................... 210/189, 268, 210/269, 274, 196, 792, 805, 807

[56] References Cited

U.S. PATENT DOCUMENTS

| | | | |
|---|---|---|---|
| 1,123,704 | 1/1915 | Deacon et al. | 210/189 |
| 3,798,159 | 3/1974 | Kisbocskoi et al. | 210/805 |
| 4,126,546 | 11/1978 | Hjelmner et al. | 210/268 |
| 4,197,201 | 4/1980 | Hjelmner et al. | 210/189 |
| 4,330,401 | 5/1982 | Boze et al. | 210/106 |
| 4,482,457 | 11/1984 | Jacquet | 210/270 |
| 4,707,252 | 11/1987 | Durot et al. | 210/151 |
| 5,277,829 | 1/1994 | Ward | 210/792 |
| 5,462,654 | 10/1995 | Hering, Jr. | 210/97 |

FOREIGN PATENT DOCUMENTS

| | | |
|---|---|---|
| 0590705A1 | 4/1994 | European Pat. Off. . |
| 2634469A1 | 2/1978 | Germany . |
| 2753064A1 | 6/1978 | Germany . |

*Primary Examiner*—Cynthia L. Nessler
*Attorney, Agent, or Firm*—Chilton, Alix & Van Kirk

[57] ABSTRACT

A deep bed filter system comprising a plurality of filter media beds, each having a respective media regeneration sub-system that includes some components associated with an individual filter bed and other components that are shared with all filter beds in the system, thereby improving the utilization of available space and lowering the materials and labor costs relative to known systems. A central column extends upwardly along the axis through the upper and lower portions of the vessel, thereby defining an annular volume extending substantially from the bottom of the vessel through the upper and lower portions. A plurality of distinct tubes extend through the central column, with each tube having a lower, intake end situated at the bottom for drawing dirtied filter media from the lower portion of the vessel into the column and transporting the drawn media upwardly through the column to a second discharge end at an elevation above the filtrate level of the filtrate region. A plurality of media washing devices are each situated in an azimuthally distinct location above the region of filter media and are fluidly connected to at least one of the transport tubes such that each tube delivers a substantially continuous flow of dirtied media to only one washing device. A plurality of media distribution devices associated respectively with the plurality of washing devices, direct the dropping clean media to a respective plurality of locations on the region of filter media.

26 Claims, 9 Drawing Sheets

DEEP BED FILTRATION SYSTEM

BACKGROUND OF THE INVENTION

The present invention relates to so-called deep bed media filters, particularly of the type that include a plurality of filter units arranged or connected as a filter system or installation.

U.S. Pat. No. 5,277,829, which issued on Jan. 14, 1994 to the assignee of the present invention, discloses a deep bed filter unit in which the infilt flows upwardly through a sand bed such that the filtrate accumulates above the sand bed while the dirty sand is continuously regenerated. A plurality of such units can be connected by a common inlet manifold and a common outlet manifold, to form a system or installation, e.g., at a wastewater treatment plant. Another type of regenerative deep bed filter unit in which the infilt flows upwardly, is disclosed in U.S. Pat. Nos. 4,123,456 and 4,126,546. These patents also shows a plurality of modular units clustered to form a system or installation.

In northern areas of the United States (and other regions of the world that experience frozen ground during winter or other ground instabilities such as flooding or earthquakes), the filter systems are preferably supported above ground, on stilts or the like. In areas of more stable temperature and other ground conditions, it may be desirable to wholly or partially embed the filter systems in the ground. A major advantage of the latter arrangement, is the lower cost associated with pouring large concrete basins into a ground excavation, rather than forming and shipping vessels made of steel to be supported by stilts. One drawback of the poured concrete basin, however, is the difficulty some contractors face in properly contouring the basin, especially where the basin is constituted by a plurality of modular vessel units each of which requires its own cylindrical funnel-shaped bottom, as disclosed in said U.S. Pat. No. 4,126,546. These units require tight tolerances for the components to fit properly and to seal against the basin walls.

SUMMARY OF THE INVENTION

It is, accordingly, an object of the present invention, to provide a deep bed filter system or installation that accommodates a plurality of filter units within a simplified basin that can be readily fabricated, preferably by poured concrete in a ground excavation.

It is another object to provide a deep bed filter system having no seals between the concrete basin walls and the internal components.

It is a further object of the invention, to provide a deep bed filter system comprising a plurality of filter media beds, each having a respective media regeneration sub-system that includes some components associated with an individual filter bed and other components that are shared with all filter beds in the system, thereby improving the utilization of available space and lowering the materials and labor costs relative to known systems.

It should be appreciated that many of the inventive features described herein can readily be incorporated into a deep bed filter system that is not constructed from a poured concrete basin, but rather has the form of an above ground, upright vessel, such as shown in U.S. Pat. No. 5,227,829. In a general way, the invention as implemented in a vessel, includes an upright vessel having a central vertical axis, an upper portion of substantially uniform cross section, and a lower portion that tapers downwardly from the upper portion towards the axis to a closed bottom. A central column extends upwardly along the axis through the upper and lower portions of the vessel, thereby defining an annular volume extending substantially from the bottom of the vessel through the upper and lower portions. A region of filter media fills the annular volume in a lower portion of the vessel, and extends upwardly into the annular volume of the upper portion of the vessel. The media in the lower portion of the basin is in fluid communication with the bottom. Inlet means are provided for receiving a continuous flow of infilt from a source outside the vessel and distributing the infilt at a plurality of azimuthally spaced locations in the region of filter media. The hydraulic pressures within the vessel are such that the infilt flows upwardly through the media in the upper portion of the vessel and accumulates therein as a filtrate region above the region of filter media while dirt in the infilt is trapped in the region of filter media. Transport means including a plurality of distinct tubes extend through the central column, with each tube having a lower, intake end situated at the bottom for drawing dirtied filter media from the lower portion of the vessel into the column and transporting the drawn media upwardly through the column to a second discharge end at an elevation above the filtrate level of the filtrate region. This transport induces a downward movement of the media in the region of filter media. A plurality of media washing devices are each situated in an azimuthally distinct location above the region of filter media and are fluidly connected to at least one of the transport tubes such that each tube delivers a substantially continuous flow of dirtied media to only one washing device. The washing device includes means for contacting the delivered dirty media with a flow of wash water such that the wash water carries the dirt in the dirty media out of the vessel as cleaned filter media drops toward the region of filter media. A plurality of media distribution devices associated respectively with the plurality of washing devices, direct the dropping clean media to a respective plurality of locations on the region of filter media, each of said locations defining an apex of a respective plurality of pyramidal media beds.

The embodiments described herein can be characterized as having a plurality of e.g., either two or four cells, with each cell defined by its own filter media wash and cleaned media distribution devices, and associated dirty media transport tubes. Each cell also has its own media bed associated therewith, i.e., the region of filter media has an upper surface which appears as a plurality of pyramidal mounds, each having an apex in contact with a respective media distribution device associated with a respective cell. At the option of the user of the invention, the filter beds associated with each cell can be either completely or partially isolated from each other.

The hybrid nature of the present invention, wherein distinct cells have some features which are associated uniquely therewith, and yet have other features which are shared with other cells within the system, provides several advantages relative to known systems. The present invention can be fabricated at less cost and installed more quickly in the field. The system permits a redundant transport sub-system, preferably an airlift sub-system, such that a problem in any one cell does not disable the entire system. The system can be installed without the cost associated with maintaining tight tolerances on the concrete basin, because the concrete does not provide any sealing interfaces that could leak and contaminate the filtrate or otherwise degrade the efficiency of operation.

With the present invention, there is virtually no possibility of structural failure of the system. The operation of each cell maintains the flow and cleaning of the dirty sand in a manner that does not contaminate the filtrate or otherwise filtrate collection volumes.

BRIEF DESCRIPTION OF THE DRAWINGS

These and other objects and advantages of the invention will become more evident from the following description of the preferred embodiments and the accompanying drawings, in which.

DESCRIPTION OF THE PREFERRED EMBODIMENT

FIGS. 1–6 show various views associated with a first embodiment of the present invention, directed to a deep bed filter system 100 having two filter media beds 101,102 and two media washing devices 103,104 for providing substantially continuous regenerative operation for the secondary treatment of, for example, water in a waste water treatment plant. As will be described in greater detail below, a plurality of filter systems of the type described with respect to FIGS. 1–6, can be situated side-by-side to form a filter installation.

Figure 1:
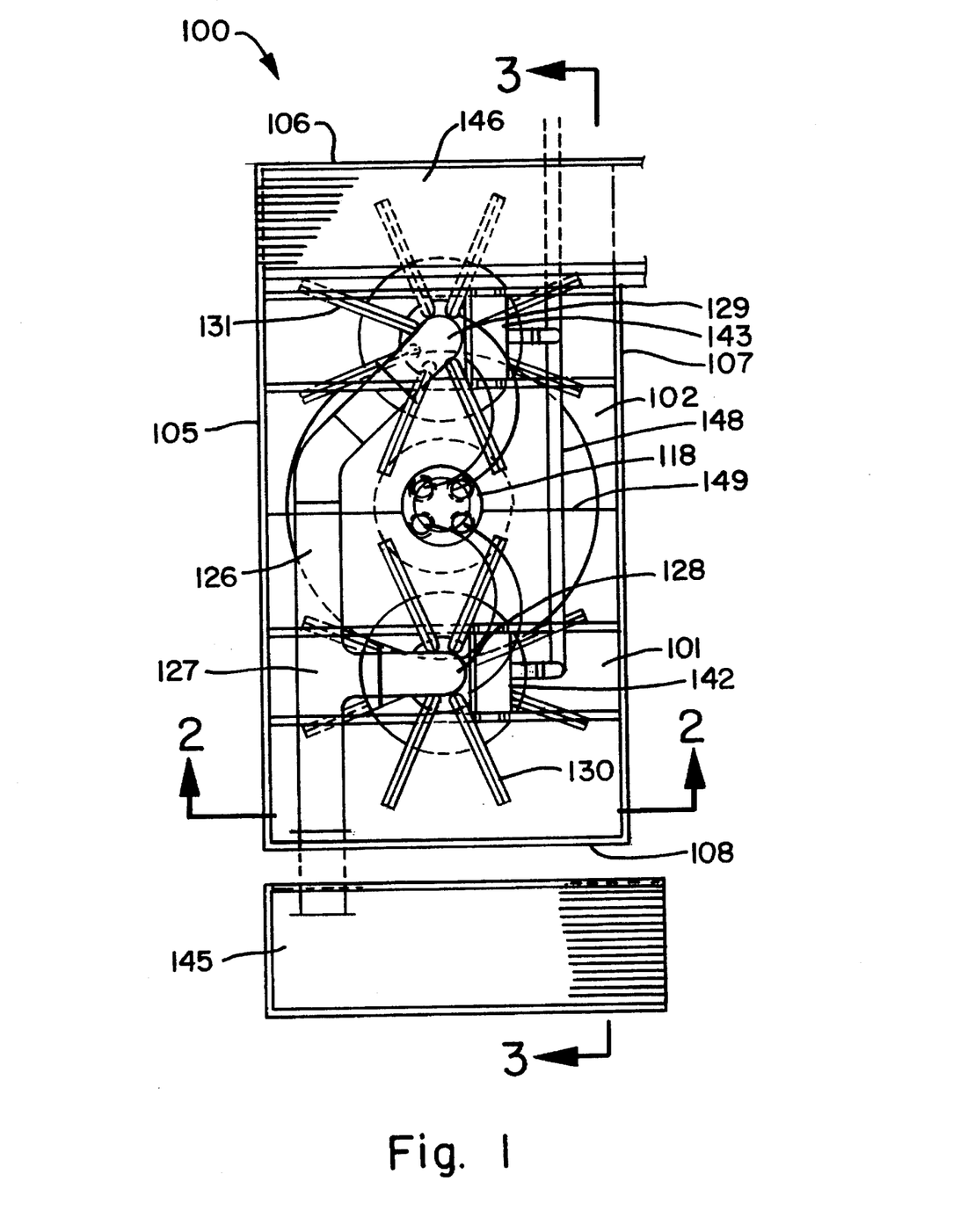
FIG. 1 is a plan view of a filter system consisting of two filter media beds and two media washing devices in accordance with a first embodiment of the present invention.
Figure 2:
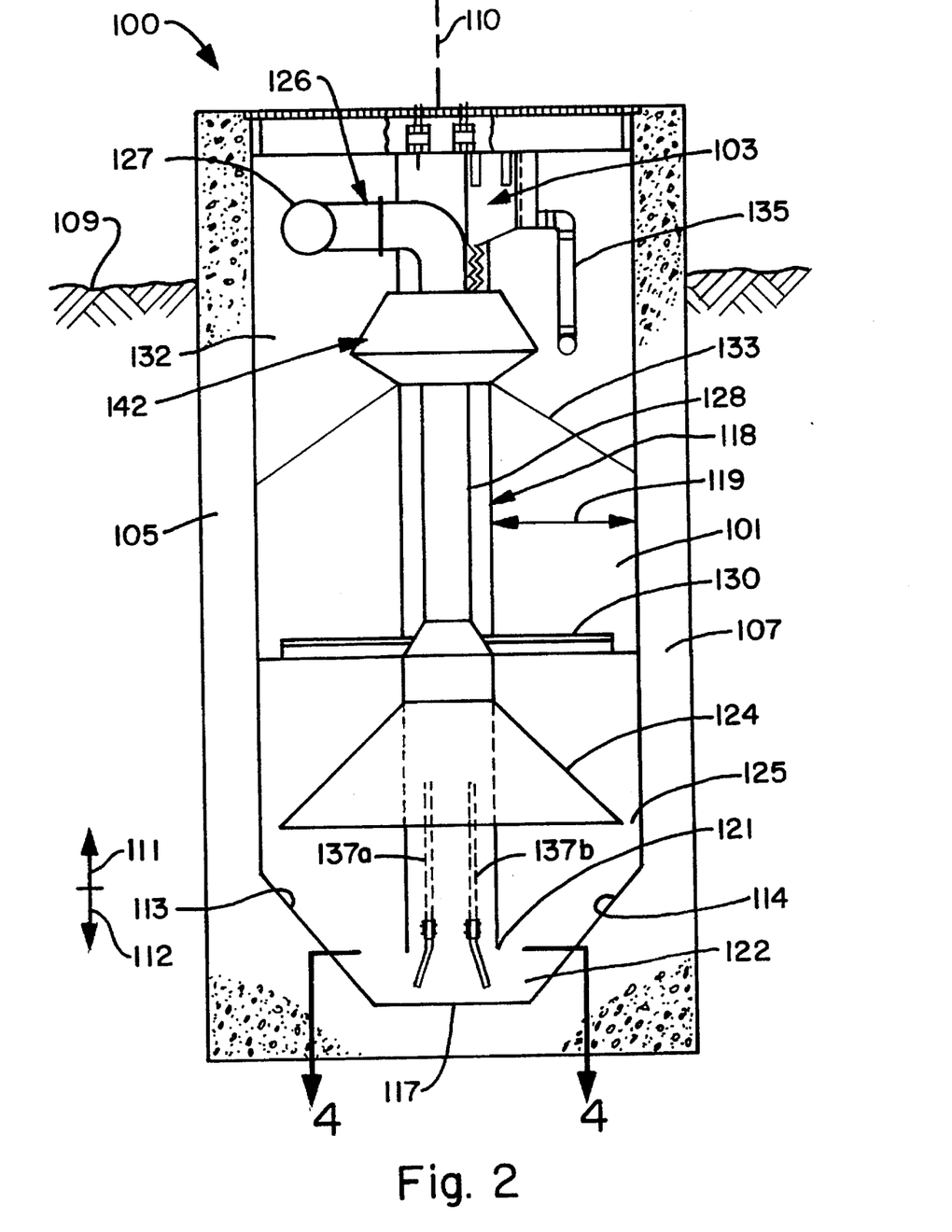
FIG. 2 is a section view taken along line 2—2 of FIG. 1.
Figure 3:
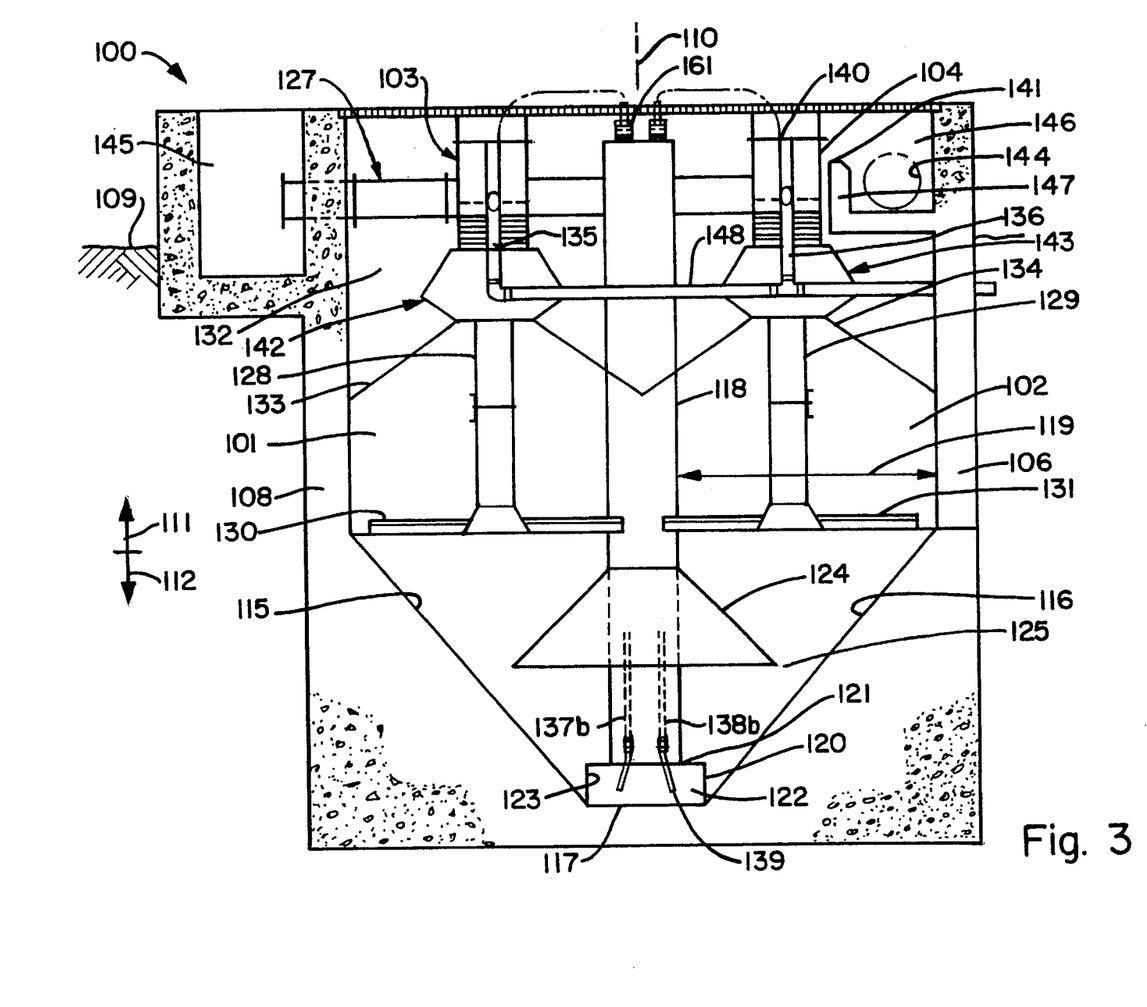
FIG. 3 is a section view taken along line 3—3 of FIG. 1.

In the plan view of FIG. 1, the system 100 has a substantially rectangular perimeter, which, as can be seen in the two section views of FIGS. 2 and 3, is preferably in the form of upright walls 105, 106, 107, 108 of poured concrete. The poured concrete forms a basin or vessel which is preferably embedded in a ground excavation, so that most of the vertical extent of the basin is below ground level 109. The basin has a central vertical axis 110, an upper portion 111 having vertical perimeter walls, 105, 106, 107, 108 and a lower portion 112 having side walls 113, 114, 115, 116, angled or tapered obliquely downwardly from the perimeter walls towards the axis and a bottom 117 wall which closes the side walls. The upper portion preferably has a substantially uniform cross section. An, e.g., cylindrical central column 118 extends upwardly along the axis, thereby defining, e.g., a cylindrical outer surface that is spaced from the basin walls 105–108 and 113–116 so as to define a substantially annular side volume 119 therebetween. The lower end of the column 118 is spaced from the bottom wall 117. A skirt or similar structure 120 can optionally extend from the lower end 121 of the central column toward the bottom wall, thereby encapsulating a bottom volume 122 which is in fluid communication with the side volume 119.

A region of particulate filter media, such as sand, fills the side volume 119 in the lower portion 112 of the basin and extends upwardly into the side volume of the upper portion 111 of the basin. For reasons that are explained more fully below, the media region can be understood as being constituted by two media beds 101,102. The media in the side volume in the lower portion of the basin is in fluid communication with the bottom volume 122 through openings 123 or the like in the skirt 120. A frustoconical apron or similar structure 124 is situated in the lower portion 112 of the basin, preferably surrounding the central column 118 and extending obliquely toward the basin walls, thereby defining an annulus 125 of relatively small cross sectional area through which media above the apron 124 can flow toward the bottom volume 122.

An inlet conduit 126 receives a substantially continuous flow of liquid to be filtered, i.e., infilt, from a source outside the basin. In the illustrated embodiment, the inlet includes a pipe section 127 which receives infilt at the upper portion of the basin for delivery through two vertical conduits 128, 129 to an elevation above the apron 124, where the infilt is distributed at a plurality of azimuthally spaced locations in the media in the side volume 119. Distribution members can preferably take the form of a plurality of distribution spokes 130,131, that extend radially from respective conduits 128, 129 and are perforated along their radial extension such that infilt can be distributed substantially uniformly in the respective media beds 101,102 at an elevation substantially between the upper and lower portions 111, 112. The infilt then flows upwardly through the media in the side volume 119 of the upper portion of the basin and accumulates as a region 132 of filtrate. During this upward flow, the dirt and other solids are trapped in the media such that, upon emerging from the upper surfaces 133,134 of the media beds 101,102, clean liquid accumulates in the side volume above the media beds in the upper portion of the basin, while the dirt in the infilt remains trapped in the media in the side volume.

The basic operating principle of the present invention, is somewhat similar to that described in U.S. Pat. No. 5,277, 829, the disclosure of which is hereby incorporated by reference. The infilt moves upwardly through the region of filter media, while the filter media moves downwardly, carrying the accumulated dirt therewith, whereupon, at the bottom volume 122 of the basin, the dirty media is transported to a media washing device 103 or 104. The washing device provides a flow of washing fluid, preferably in counter current to the flow of dirty media, such that the dirt is flushed from the media and withdrawn from the filter system as reject flow via line 135 or 136, while the cleaned sand is deposited at the upper surface 133,134 of the filter media beds. In other words, the filter media is substantially continuously regenerated.

In the present invention, the dirty filter media is transported through a plurality of distinct tubes 137a, 137b and 138a, 138b extending through the central column 118, each tube having a lower, intake end 139 situated in the bottom volume 122 for drawing dirtied filter media through the skirt openings 123 from the side volume in the lower portion of the basin, into the column 118 and transporting the drawn media upwardly through the column to a discharge end 140 at an elevation above the filtrate level 141 of the filtrate region 132. This transport of the media upwardly through the tubes, induces the downward movement of the filter media through the region of filter media.

A plurality of the washing devices 103,104 are situated at least partly in the basin, each washing device located in an azimuthally distinct position above the region of filter media and fluidly connected to at least one of the transport tubes 137,138. Preferably, each tube delivers a substantially continuous flow of dirtied media to only one washing device. The washing device induces contact of the delivered dirtied media with a flow of wash water such that the wash water carries the dirt in the dirty media out of the basin and the clean filter media drops toward the region of filter media where a plurality of media distribution devices 142,143 associated respectively with the plurality of washing devices 103,104, direct the dropping cleaned media to a respective plurality of distinct locations on the region of filter media.

An outlet line 144, in fluid communication with the filtrate region 132, draws a flow of filtrate from the basin.

As is evident from FIGS. 1 and 3, the source of infilt can be an elongated trough 145 which runs alongside a plurality of systems 100 situated side-by-side to form a large filter installation or plant. Similarly, another trough 146 can run along the installation, for receiving and carrying away the filtrate contributed by the outlet line 144 of each system. As shown in FIG. 3, the horizontal run of inlet conduit 127 from the infilt trough 145 includes branches which each deliver the infilt to the vertical conduit portion 128,129 which passes respectively through each wash device 103,104. The filtrate level 141 in the filtrate region is established by the elevation of a weir 147 which forms the inside of the filtrate trough 146 such that, during operation, the filtrate level in the filtrate region is at or above the liquid level in the horizontal run 127 of the inlet conduit.

The reject from each of the two wash devices 103,104 in the system 100, flows first horizontally and then downwardly via lines 135,136 to a common removal pipe 148 that also receives contributions from each of the systems in the installation.

As shown in FIGS. 1 and 3, the two wash devices 103,104 are preferably situated equidistantly from the central column 118, and preferably situated midway between the column 118 and the perimeter walls 106,108. The vertical run 128, 129 of each distribution conduit, passes through a respective media distribution device 142,143 associated with a wash device, and is approximately equidistantly situated between the central column and the perimeter walls in the upper portion of the basin. Below the radial distribution spokes 130,131, however, the basin walls taper inwardly to form a natural funnel which, in cooperation with the apron 124 on the central column, limits the downward flow of dirty media.

It can be appreciated that the basin as shown in FIGS. 1–3, can be constructed from a wooden form for receiving poured concrete. If the wall deviations are angular, the construction contractor need not dig a cylindrical hole in the ground, nor fabricate cylindrical or frustoconical wall surfaces.

Figure 10:
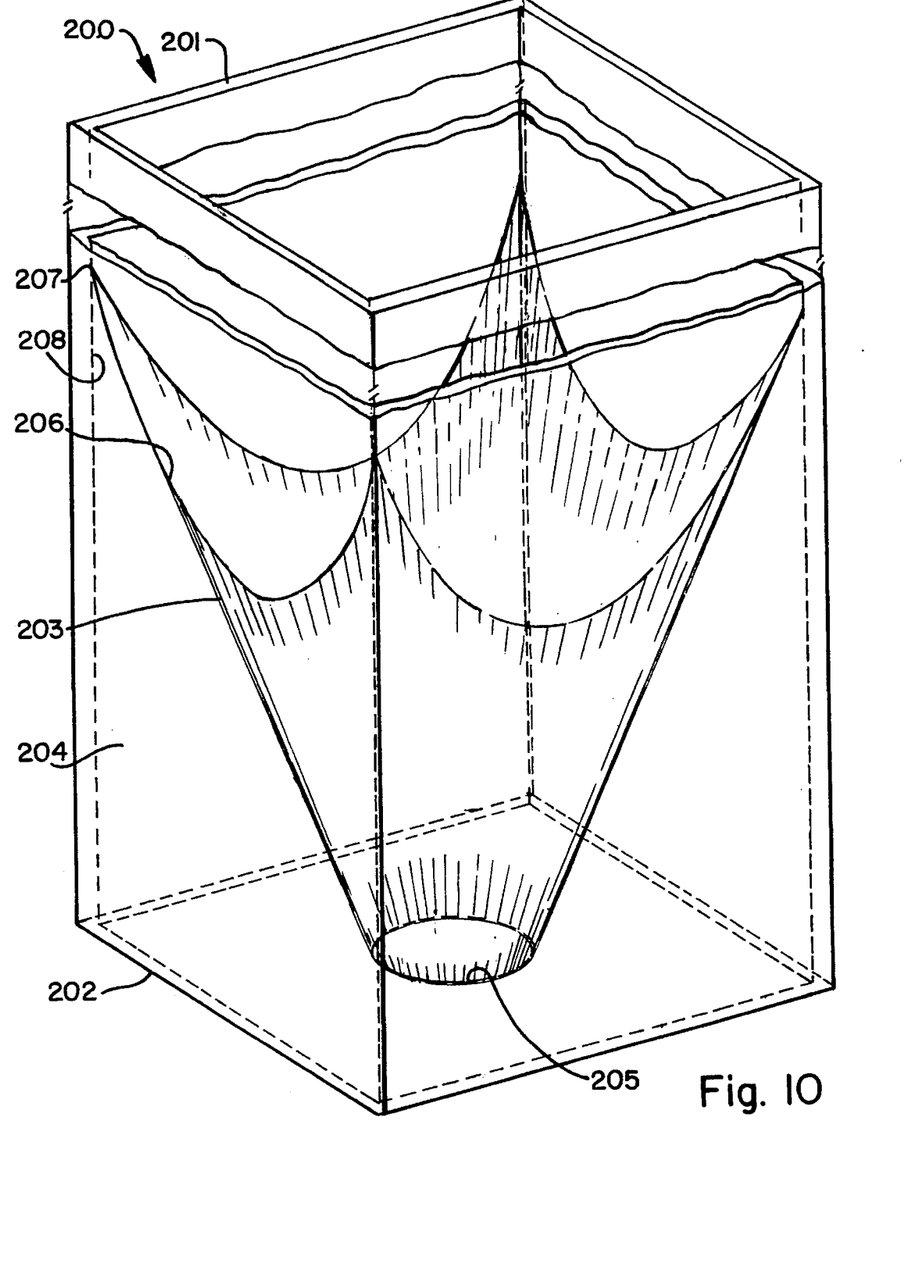
FIG. 10 illustrates the preferred technique for constructing the basin for an imbedded version of the invention.

FIG. 10 shows the preferred way in which a basin can be constructed for implementing the present invention with a substantially conical lower basin. The basin 200 has four rectilinear perimeter walls that are first poured into a rectilinear excavation, in a conventional manner. These walls include four side walls 201 and a bottom wall 202. When the concrete has dried, a tapered liner, preferably of thin stainless steel, is inserted such that all or a portion of the upper edge of the liner contacts the perimeter walls 201, thereby leaving a tapered volume between the lower portion of the side walls and the lower surface of the liner. This tapered volume 204 is then backfilled with, for example grout, or other material which upon hardening, provides a rigid foundation for the tapered liner. The tapered liner 203 can be substantially frustoconical in the sense that a small diameter opening 205 is provided on the axis so to rest against bottom wall 202 and form a boundary for the lower volume 122 (as shown in FIG. 3).

The liner 200 as placed within basin walls 201 against wall 202, has downwardly arched side edges 206 which abut walls 201 and high points 207 that fit into the corners 208. The shape of the liner is preferably similar to that resulting from making four mutually perpendicular, non-intersecting vertical cuts through a frustoconical steel member. Precise fitting of the liner 203 against the walls 201,202 is not necessary, in that the grout or other backfill material will, upon drying, provide sufficient barrier to the loss of sand or water.

Figure 4:
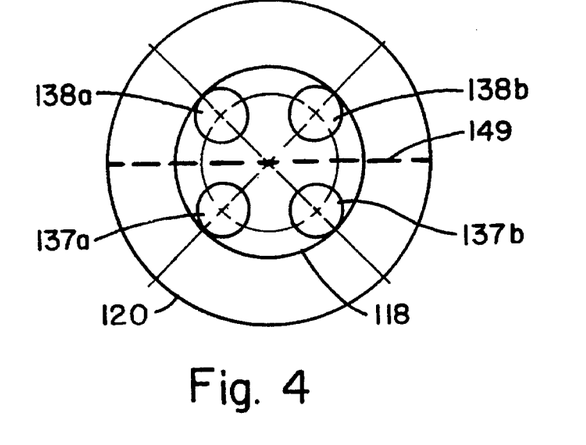
FIG. 4 is a section view taken along line 4—4 of FIG. 2.

FIG. 4 is a section view along line 4—4 of FIG. 2, showing the skirt 120, the inside surface of the central column 118, and four transport tubes 137,138 which are part of an air lift sub-system, to be described in detail below. For present purposes it should be understood that two of the transport tubes 137a, 137b service one of the wash devices 103, whereas the other two transport tubes 138a, 138b service the other wash device 104. Thus, the central column 118 includes a sub-system which services a plurality of wash devices within the same basin.

Divider structure (shown in phantom at 149) can be provided to maintain isolation between the portion of the filter media region associated with each wash device, i.e., to maintain separation of the multiple filter beds 101,102. Such separating wall could extend to an elevation above the filtrate level. Under such circumstances, separate channels leading to the filtrate trough 146 should be provided. It is preferred, however, that no dividing wall will be provided within the basin. Some co-mingling of dirty sand may thus be possible in the lower volume 122, and a co-mingling of the filtrate would occur in the region of filtrate 132, before the filtrate passes over the weir 147.

Importantly, the dirty media transport tubes 137,138 do not pass through the filter media region, but rather are isolated therefrom as a result of their vertical traverse through the central column 118. The central column as shown in FIG. 4, provides sufficient space for service operations to be performed on the transport subsystem, without draining the media from the basin.

Figure 5:
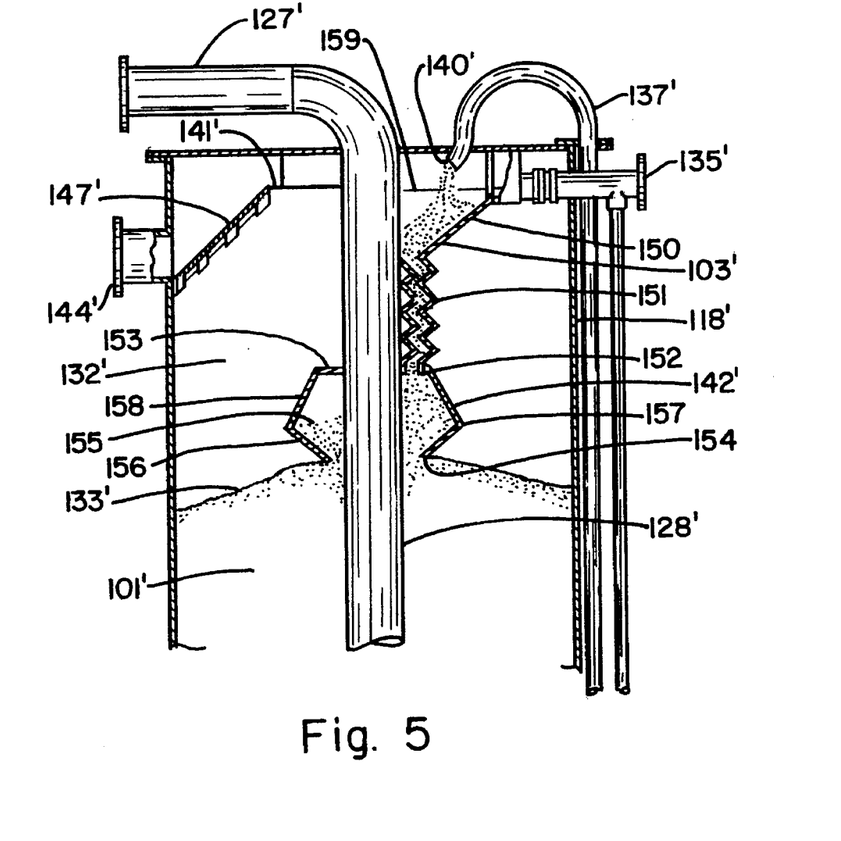
FIG. 5 is an elevation view of the preferred filter media washing device and associated clean sand distribution member.

FIG. 5 shows the preferred relationship of each wash device 103' and associated distribution member 142, to the vertical run 128' of the inlet conduits and to the media transport tubes 137. Although certain details shown in FIG. 5 differ somewhat from the arrangement shown in FIGS. 1–4, the wash and distribution functionality thereof is substantially equivalent so that the primed numeric identifiers denote functionally similar structure to that shown in FIGS. 1–4. The media transport tube 137' is isolated from the region of filtrate 132' as it passes upwardly to an elevation above that of the level 141' of filtrate in the filtrate region 132. The dirty media is deposited into a wash chamber 150, which includes a baffled lower portion 151 which has a substantially zig-zag shape. The lower end 152 of the baffled portion enters the upper, covered portion 153 of the media distribution member 142' such that, the discrete particles of media fall downwardly through the wash chamber, baffles, and into the distribution member. The chamber, baffle, and distribution member are isolated from the filtrate in the filtrate region 132' above the surface 133' of the media region. The distribution member 142' has an open bottom 154 in contact with the upper surface 133' of the media. As cleaned media falls into the distribution member, the media accumulates therein to form a reservoir 155 of clean media. This assures that a sufficient supply of clean media is available to pass out of the distribution member at 154 to the apex of the filter bed 101', without creating a gap between the lower, open end 154 of the distribution member and the filter media bed 101'.

The flow of wash liquid passes upwardly from the filter bed 101' into the distribution member 142', and continues through the baffle portion 151 of the wash device where the dirt experiences a counterflow which carries the dirt upwardly and out through the reject conduit 135'.

The distribution member 142' preferably has a frustoconical shape at the lower portion 156, with the smaller diameter defining the opening 154 and the larger diameter 157 defining the maximum width of the distribution member. The upper portion 158 of the distribution member could be cylindrical, or frustoconical in the opposite orientation to the lower portion, but with the difference that the upper surface 153 of the distribution member is closed except for the penetration by the baffle portion 152 of the wash device.

All of the wash device 103' is isolated from the filtrate in the filtrate region 132'. Because the level 141' of filtrate in the filtrate region is above the level 159 at a which the reject flow passes out of the wash device, there is a net hydraulic pressure differential which maintains the flow of filtrate from the filter bed 101' directly into the open lower end 154 of the media distribution member 142'.

The wash and distribution sub-system described immediately above, provides the important advantage in that none of the dirt present in the wash and distribution system has any path for entering into the filtrate region 132'. The shape of the distribution member 142' maximizes the reservoir 155 of clean sand available for flow into the filter bed 101', while minimizing the extent of the surface area 133' of the top of the filter bed that has been removed as a source of filtrate flow into the filtrate region 132'.

It can be appreciated from FIG. 5, that the horizontal portion of the inlet line 127' can be at an elevation above the basin, rather than at an elevation corresponding to the filtrate level 141' in the filtrate region.

Figure 6:
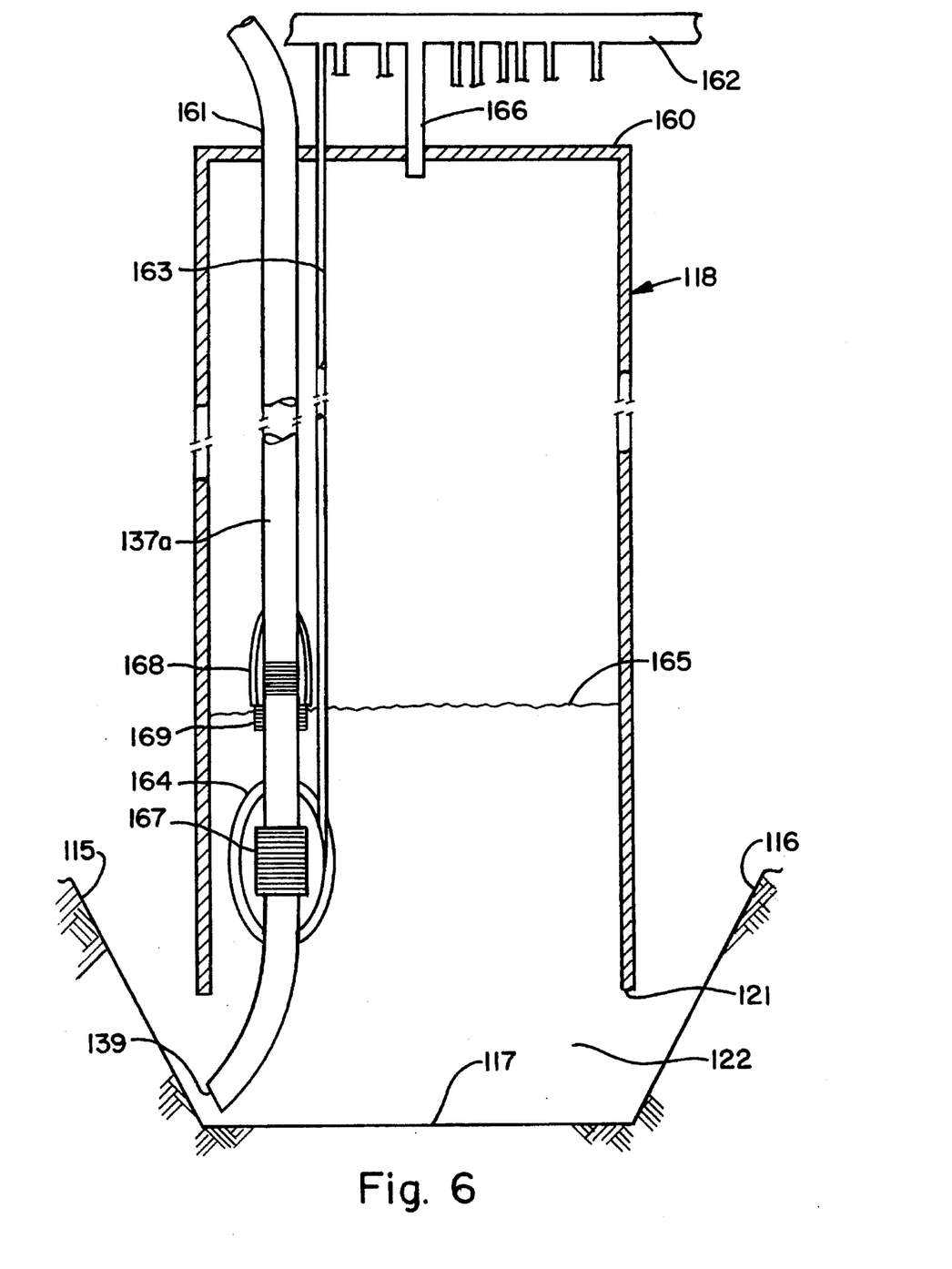
FIG. 6 is an elevation view of the preferred air injection structure for the dirty media transport tube.

FIG. 6 schematically shows the preferred air lift media transport sub-system as implemented in the system shown in FIG. 3. Like numerals refer to like components in the two views.

The central column 118 is preferably cylindrical with an open bottom 121 and an airtight, selectively removable top 160. Sealed penetrations 161 are associated with the air lift sub-system. The air lift sub-system provides a plurality of air lift tubes 137, as mentioned above, with each tube 137a having a lower end 139 that is at or slightly spaced from the bottom wall 117 in the bottom volume 122 of the basin, and an opposite end 140 which discharges into one wash device. As shown in FIGS. 1 and 3, the portion of each transport tube between penetration 161 and discharge end 140, can be a replaceable hose. A typical transport tube would have an ID of about 1¼ inch (3.5 cm). All of the transport tubes (only one is shown) would be supplied from a common source of compressed air, such as the manifold 162, via an individual supply line 163 which extends downwardly through the column 118 to an injector collar 164 near the open end of the column. It is expected that, due to the slurry-like consistency of the dirty sand at the lower portion of the basin, some water will separate from the slurry and rise in the central column to a level such as 165. To prevent this water level from rising excessively, a branch 166 from the compressed air manifold 162 delivers air into the column 118, thereby establishing a super-atmospheric pressure therein, which can be regulated to maintain the water at a desired level 165. The injection collar 164 for each transport tube is preferably below the water level in the column.

The compressed air can be delivered in any known manner through the intake slots 167 of the tube 137 within the collar, thereby creating a vacuum at the lower end 139 of the tube, which draws the slurry of dirty media into the tube and transports it to the wash device.

The supply line 163 for the compressed air is preferably a pipe having an ID of about ¼ inch (0.6 cm), with air introduced into the injection collar at a pressure of about 20 psi (140 kp).

The upflow of air in the tubes can be augmented by providing a second collar 168, in the form of a sleeve or the like which has perforations 169 through which the superatmospheric air in the column flows radially inwardly such that the secondary air flow joins the primary air flow to reinforce the upward lift. The air pressure in the column 118, which induces the flow of secondary air, is preferably maintained at about 15 psi (100 kp).

In the embodiment of FIGS. 1–5, at least two transport tubes deliver dirty media to each washing device. By using at least two tubes per cell, rather than a single large tube to service all cells, higher velocities can be achieved, providing an improved scrubbing effect which tends to better separate the dirt from any adherence to the filtrate particulates, thereby facilitating rapid separation in the wash device. Furthermore, if a problem should arise with one transport tube, the other can maintain operation of the affected cell, albeit perhaps at a reduced efficiency. In any event, multiple transport tubes are provided within the central column 118.

Figure 7:
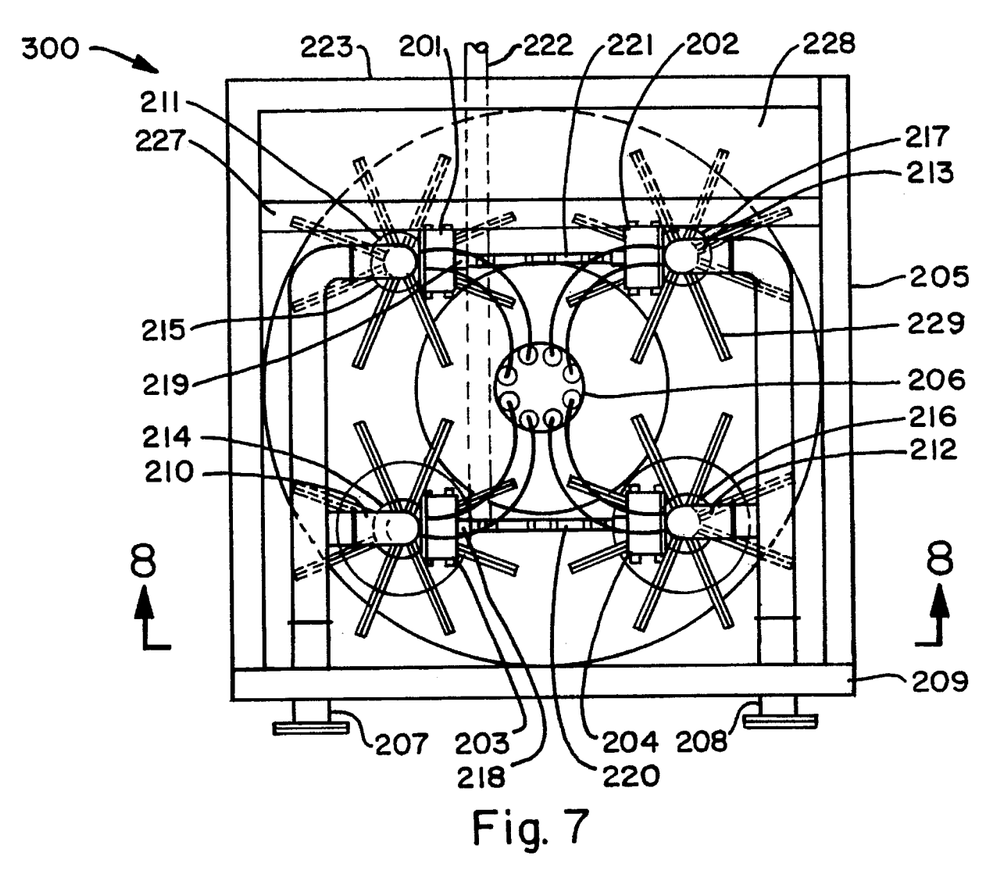
FIG. 7 is a plan view of a second embodiment of the inventive filter system, having four media beds and four washing devices.
Figure 8:
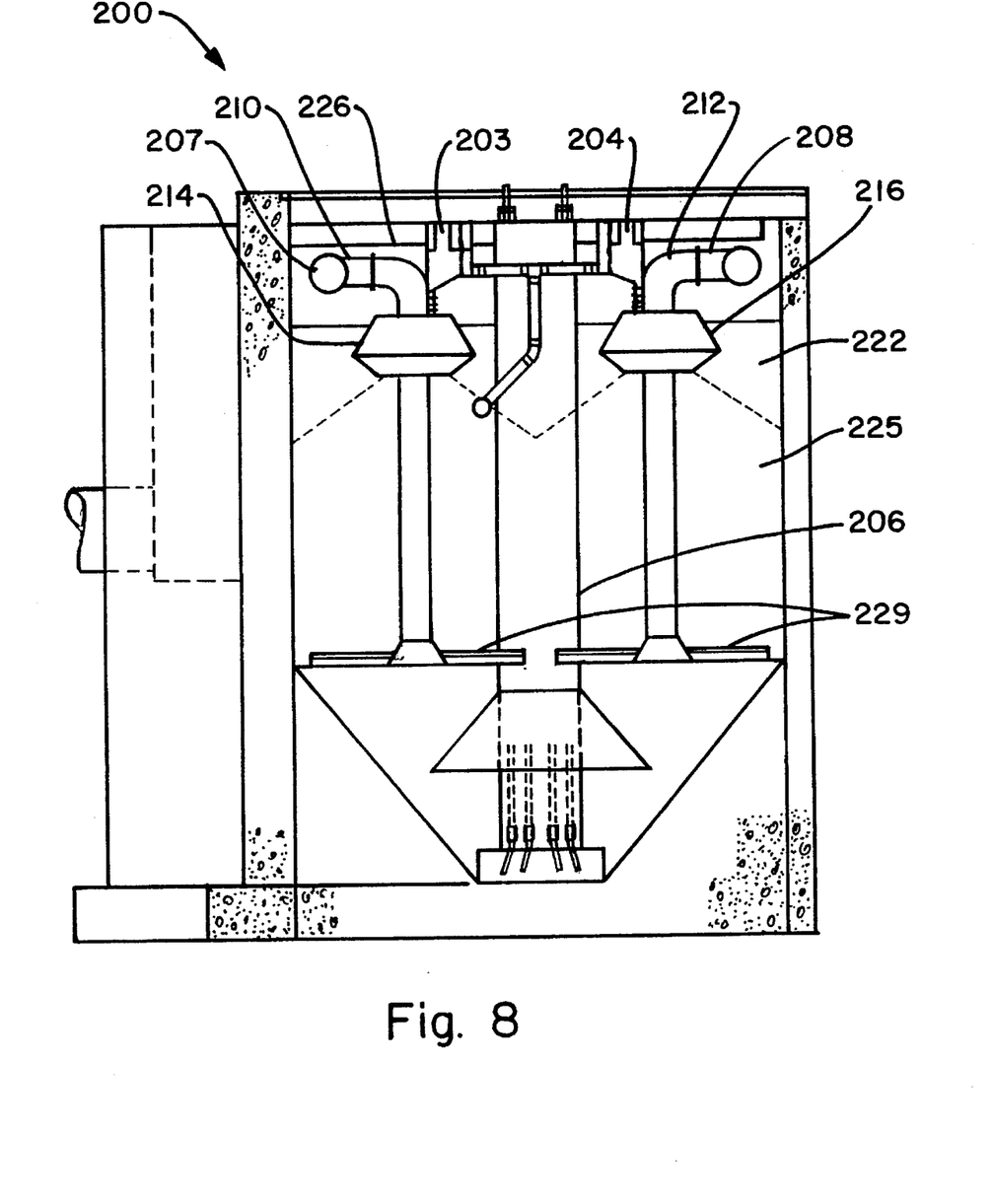
FIG. 8 is a section view taken along line 8—8 of FIG. 7.

FIGS. 7 and 8 illustrate an alternative embodiment 300 of a deep bed filter system, in which four wash and distribution members 201,202,203,204 are situated within a single basin. The basin has a substantially square perimeter 205, and each wash and distribution device is located in one quadrant along a diagonal between the central column 206 and the corners of the square. In the illustrated embodiment, the two inlet conduits 207,208 penetrate one of the upright walls 209 and have branches 210,211,212,213 that extend toward a respective distribution member 214,215,216,217 and pass centrally therethrough. The reject lines 218,219,220,221 from the four wash devices empty into a common reject pipe 222 which penetrates the opposite side wall 223 of the basin. The filtrate region 224 above the filter media 225, has a level 226 above the inlet conduits 207,208, which spills over a weir 227 into a collection trough 228.

As in the previously described system 100, the infilt is distributed throughout the region of filtrate, via spoke-like members 229 which extend radially from a vertical run of inlet pipe in each quadrant.

Figure 9:
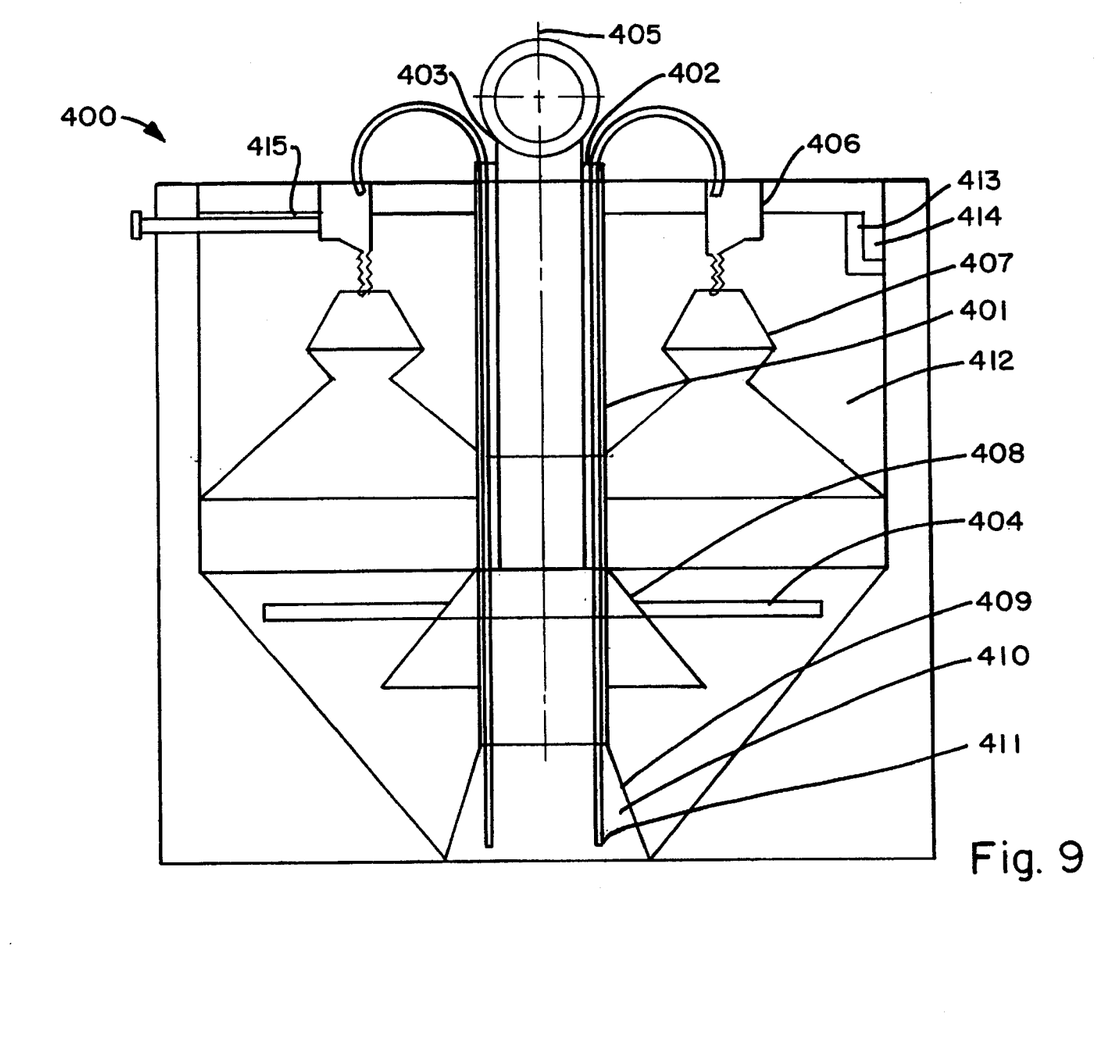
FIG. 9 is an elevation view of a third embodiment of the inventive filter system, having a single, centrally located, vertically oriented manifold for delivering infilt to each of four media beds.

FIG. 9 schematically illustrates a third embodiment 400, in which the central column 401 contains not only the dirty sand transport tubes 402, but also the vertical run of a common inlet conduit 403. In this embodiment, the infilt distribution spokes 404 extend radially substantially from the axis 405 of the basin to a multiplicity of azimuthal locations in the various filter media beds. A large basin having a perimeter in plan view in the shape of, for example, an octagon, (with eight contiguous, inwardly angled lower walls) could easily accommodate four sets of wash and distribution members 406,407, i.e., one in each quadrant. Two of these are shown in FIG. 9, with their associated dirty media transport tube, wash chamber and baffle portion, and clean media distribution member. As in the previously described embodiments, the distribution member 407 has a closed top except for the penetration of the baffle portion or other fluid connection to the wash device, and an open bottom portion through which a continuity of media extends through the filter bed up into the distribution member. The lower portion of the distribution member is frustoconical, to provide the desired reservoir while minimizing the area of the filter bed that does not contribute to the flow of filtrate into the region of filtrate.

As in the other embodiments, an apron 408 is provided from the central column 401 for shaping the multiple filter beds in the basin, and a skirt or similar structure 409 is provided at the bottom, for defining a bottom volume 410 where the lower ends 411 of the transport tubes 402 draw up the dirty media. The filtrate from the filtrate region 412 passes over a weir 413 into a filtrate trough 414, and the reject lines 415 pass out of the basin wall. In this embodiment, the air transport tubes 402 would pass through the central column, on the outside of the single vertical run 403 of inlet pipe. The spokes 404 extent radially through the central column 401 and apron 408 into the media beds substantially between the upper and lower side volumes.

I claim:

1. A deep bed filter system for removing dirt from a flow of infilt to produce a flow of filtrate, comprising:

an upright vessel having a central vertical axis, an upper portion of substantially uniform cross-section, and a lower portion that tapers downward from the upper portion toward said axis to a closed bottom;

a central column extending upwardly along said axis through the upper and lower portions of the vessel thereby defining a substantially annular volume therebetween extending substantially from said bottom through the upper and lower portions;

a region of filter media filling the annular volume in the lower portion of the vessel and extending upwardly into the annular volume of the upper portion of the vessel, said media in the lower portion of the basin being in fluid communication with said bottom;

inlet means for receiving a continuous flow of infilt from a source outside the vessel and distributing the infilt at a plurality of azimuthally spaced locations in the region of filter media such that the infilt flows upwardly through the media in the upper portion of the vessel and accumulates as a filtrate region above the region of filter media while dirt in the infilt is trapped in the region of filter media;

transport means including a plurality of distinct tubes extending through said column, each tube having a lower, intake end situated at said bottom for drawing dirtied filter media from the lower portion of the vessel into said column and transporting the drawn media upwardly through the column to a second, discharge end at an elevation above the filtrate level of the filtrate region in said upper portion of the vessel, thereby inducing a downward movement of the media in the region of filter media;

a plurality of media washing devices each situated in an azimuthally distinct location above the region of filter media and fluidly connected to at least one of said transport tubes, for receiving a substantially continuous flow of dirtied media from said transport means, each washing device including means for contacting the received dirtied media with a flow of wash water such that the wash water carries the dirt in the dirty media out of the vessel as the cleaned filter media drops toward the region of filter media;

a plurality of media distribution devices associated respectively with the plurality of washing devices, for directing the dropping cleaned media to a respective plurality of locations on the region of filter media, each of said locations associated with a respective plurality of media beds; and means in fluid communication with the filtrate region, for drawing a flow of filtrate from the vessel.

2. The filter system of claim 1, wherein each distribution device has a frustoconical lower portion which is in contact with the region of media, and receives cleaned media from a washing device to maintain a reservoir of cleaned media that flows into the region of media to replace dirty media that has been withdrawn at the bottom volume.

3. The filter system of claim 1, wherein at least two tubes deliver dirty media to each washing device.

4. The filter system of claim 1, wherein the system has four wash devices located symmetrically about said axis.

5. The filter system of claim 1, wherein the transport means includes means for introducing a flow of air between the first and second ends of each tube to produce an air lift which carries the dirty media upwardly through said tubes.

6. The filter system of claim 5, wherein, the source of air is an air compressor manifolded to supply air to all of said tubes simultaneously, and one air supply line for each transport tube, extends vertically through said central column and is fluidly connected to its respective transport tube in the central column.

7. The filter system of claim 6, including, means for maintaining the central column at a pressure above ambient, and means for communicating the pressure in the central column as a secondary supply of air to each of the transport tubes.

8. A deep bed filter system for removing dirt from a flow of infilt to produce a flow of filtrate, comprising:

a concrete basin having a central vertical axis, an upper portion having upright perimeter walls, a lower portion having sidewalls tapered obliquely downward from the perimeter walls toward said axis, and a bottom wall which closes the sidewalls;

a central column extending upwardly along said axis, said central column having an outer surface spaced from said basin walls, thereby defining a side volume, and a lower end at said bottom wall which encapsulates a bottom volume;

a region of filter media filling the side volume in the lower portion of the basin and extending upwardly into the side volume of the upper portion of the basin, said media in the side volume in the lower portion of the basin being in fluid communication with said bottom volume;

inlet means for receiving a continuous flow of infilt from a source outside the basin and distributing the infilt at a plurality of azimuthally spaced locations in the media region such that the infilt flows upwardly through the media in the side volume of the upper portion of the basin and accumulates as a filtrate region in the side volume above the media region in the upper portion of the basin, while dirt in the infilt is trapped in the media in the side volume;

transport means including a plurality of distinct tubes extending through said column, each tube having a lower, intake end situated in said bottom volume for drawing dirtied filter media from said side volume in the lower portion of the basin into said column and transporting the drawn media upwardly through the column to a second, discharge end at an elevation above the filtrate level of the filtrate region in said upper portion of the basin, thereby inducing a downward movement of the media in the region of filter media;

a plurality of media washing devices each situated in an azimuthally distinct location above the region of filter media and fluidly connected to at least one of said tubes such that each tube delivers a substantially continuous flow of dirtied media to only one washing device, each washing device including means for contacting said delivered dirtied media with a flow of wash water such that the wash water carries the dirt in the dirty media out of the basin and the cleaned filter media drops toward the region of filter media;

a plurality of media distribution devices associated respectively with the plurality of washing devices, for directing the dropping cleaned media to a respective plurality of locations on the region of filter media; and means in fluid communication with the filtrate region, for drawing a flow of filtrate from the basin.

9. The filter system of claim 8, wherein said bottom volume is defined in part by a skirt extending from the lower end of the central column and said skirt has openings by which dirty media flows into said bottom volume.

10. The filter system of claim 8, wherein the inlet means penetrates the basin upper perimeter walls at an elevation below the filtrate level in said filtrate region.

11. The filter system of claim 8, wherein the system has four wash devices located symmetrically about said axis.

12. The filter system of claim 11, wherein the perimeter walls are octagonal and the wash devices are located so as to be quadrant-symmetric.

13. The filter system of claim 8, wherein each distribution device has a frustoconical lower portion which is in contact with the region of media, and receives cleaned media from a washing device to maintain a reservoir of cleaned media that flows into the region of media to replace dirty media that has been withdrawn at the bottom volume.

14. The filter system of claim 13, wherein each distribution device is fluidly isolated from the filtrate region but receives an upward flow of filtrate directly from the region of media, said upward flow passing through the media reservoir into the washing device where said upward flow of filtrate constitutes said wash water.

15. The filter system of claim 8, wherein the perimeter walls are rectangular and the sidewalls in the lower portion of the basin are defined by a tapered liner having an upper end substantially abutting the perimeter walls and backfilled with rigid material between the liner and the perimeter walls.

16. The filter system of claim 15, wherein the tapered sidewalls are formed by a substantially frustoconical liner having upper edges which closely follow the rectangular perimeter walls, and grout material hardened between the perimeter walls and the underside of the liner.

17. The filter system of claim 8, wherein the transport means includes means for introducing a flow of air between the first and second ends of each tube to produce an air lift which carries the dirty media upwardly through said tubes.

18. The filter system of claim 17, wherein the source of air is an air compressor manifolded to supply air to all of said tubes simultaneously.

19. The filter system of claim 17, wherein one air supply line for each transport tube, extends vertically through said central column and is fluidly connected to its respective transport tube in the central column.

20. The filter system of claim 19, including means for maintaining the central column at a pressure above ambient, and means for communicating the pressure in the central column as a secondary supply of air to each of the transport tubes, at an elevation within the column above the elevation where the air supply lines are connected to each transport tube.

21. The filter system of claim 8, wherein at least two tubes deliver dirty media to each washing device.

22. The filter system of claim 21, wherein the inlet means include an inlet pipe coaxially passing through the column and the transport tubes surround the inlet pipe within the column.

23. The filter system of claim 22, wherein the inlet means include a plurality of spoke members extending radially through the column into the region of media substantially between the upper and lower side volumes.

24. The filter system of claim 8, wherein the inlet means includes a plurality of inlet conduits extending vertically through the side volume, each inlet conduit having a plurality of spoke members extending horizontally, for introducing the infilt into the media.

25. The filter system of claim 24, wherein each inlet conduit passes through a media distribution device.

26. The filter system of claim 25, wherein the inlet means penetrates the basin upper perimeter sides and is fluidly connected to each inlet conduit, at an elevation below the filtrate level in said filtrate region and above said distribution devices.

* * * * *

UNITED STATES PATENT AND TRADEMARK OFFICE
CERTIFICATE OF CORRECTION

PATENT NO. : 5,520,804
DATED : May 28, 1996
INVENTOR(S) : Stephen D. Ward

It is certified that error appears in the above-indentified patent and that said Letters Patent is hereby corrected as shown below:

Column 12, line 43, "sides" should be --walls--.

Signed and Sealed this

Fifteenth Day of October, 1996

Attest:

BRUCE LEHMAN

Attesting Officer

Commissioner of Patents and Trademarks